Aug. 28, 1951     H. A. WAGNER ET AL     2,565,792
SKIP WEIGHING MEANS FOR SELF-LOADING MIXERS

Filed Dec. 12, 1949     3 Sheets-Sheet 2

INVENTOR.
Harold A. Wagner
Gustave H. Wagner
BY
Attorneys

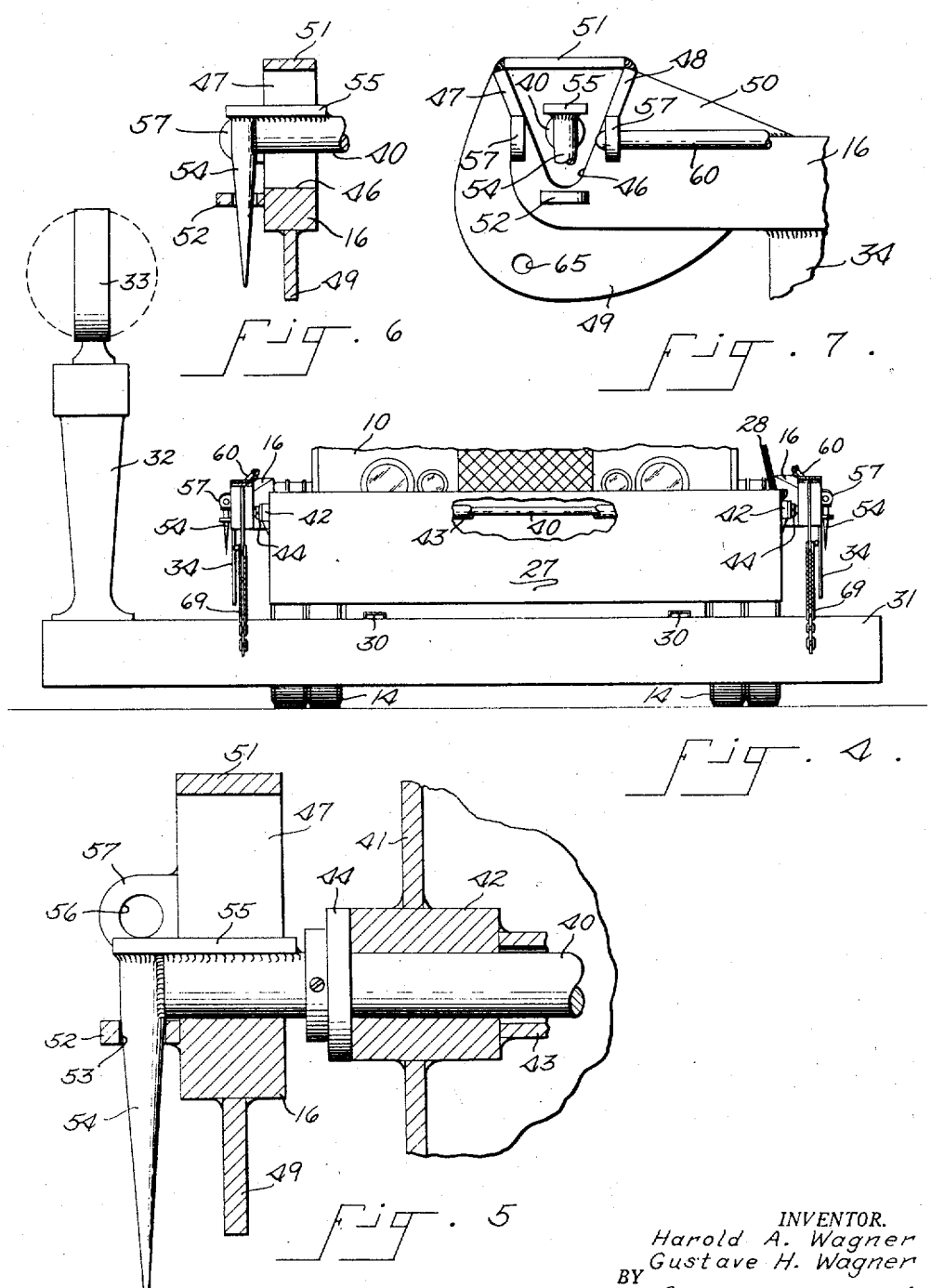

Patented Aug. 28, 1951

2,565,792

UNITED STATES PATENT OFFICE 2,565,792

SKIP WEIGHING MEANS FOR SELF-LOADING MIXERS

Harold A. Wagner and Gustave H. Wagner, Portland, Oreg.

Application December 12, 1949, Serial No. 132,602

6 Claims. (Cl. 214—78)

The present invention comprises an improvement in elevating mechanism particularly designed for depositing bulk materials in the hoppers or loading chutes of mixing machines such as concrete mixers. The present invention is herein illustrated as being incorporated in an automotive concrete mixer having a pair of skip arms pivotally mounted for swinging movement about a common horizontal axis and having a skip pivotally mounted therebetween, together with hydraulic cylinder mechanism for raising and lowering the skip arms and means for dumping the skip when it reaches a position above the mixer hopper, details of such a machine being illustrated and described in our copending application, Serial No. 106,523, filed July 25, 1949.

The principal object of the present invention is to provide means for accurately determining the weight of bulk materials such as sand, aggregate and cement used in forming a plastic mixture in order that the proportions of such a mixture may be exactly controlled according to specifications. It is common in this art to provide weighing mechanism associated with the skip, but all such mechanisms heretofore devised are subject to the objection that the levers and linkages through which the weight is measured are built into the elevating mechanism for the skip, thus providing means for errors to accumulate, especially since accurate weighing mechanisms are rather delicate instruments and quickly become out of order under the rough usage encountered. The present invention comprises means whereby the skip may be completely disassociated from the skip arms when it is lowered into position to receive a charge of bulk material, thus providing a construction whereby the exact weight of the skip and its contents may be accurately determined, and providing means whereby the weighing mechanism may be completely disassociated from the elevating mechanism.

The objects and advantages of the present invention may be more readily ascertained by inspection of the following specification taken in connection with the accompanying drawings wherein like numerals refer to like parts throughout, while the features of novelty will be more distinctly pointed out in the appended claims.

In the drawings, Fig. 1 is a partial side elevation of a machine embodying the present invention, showing the skip being weighed upon a separate weighing mechanism and showing the skip in several positions;

Fig. 4 is a front elevation corresponding to Fig. 3;

Fig. 5 is a vertical section, on an enlarged scale, taken substantially along line 5—5 of Fig. 3;

Fig. 6 is a partial view corresponding to Fig. 5, showing portions of the mechanism when the skip is disassociated from the skip arms; and Fig. 7 is a side elevation corresponding to Fig. 6.

Figure 1:
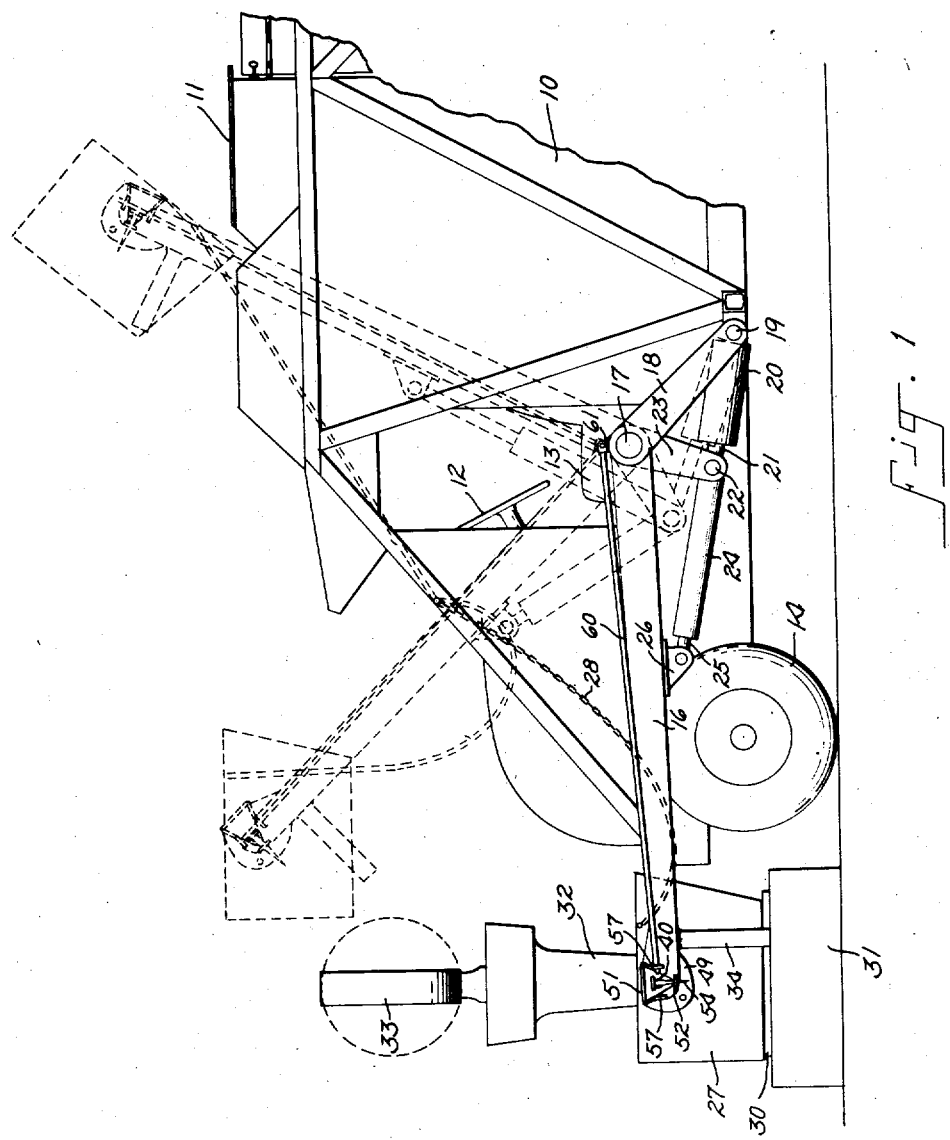

In accordance with the present invention a mobile mixing machine 10 including a mixer loading hopper 11 may be steered about by means of a steering wheel 12 controlled by an operator seated on the driver's seat 13. The vehicle is supported upon front wheels 14 and rear wheels (not shown). A pair of skip arms 16 are mounted at a lower position, each of the arms being fixed to an end of a shaft 17 suitably journaled in the chassis of the vehicle and extending transversely beneath the seat 13. A brace 18 extends from the end of shaft 17 at each side to a fixed pivot 19 at a lower point. A cylinder 20 and associated piston 21 are provided at each side of the machine, the cylinder being pivotally mounted upon the pivot 19 and the piston rod being pivotally connected to a pivot 22 in the end of a crank 23 pivotally mounted on the end of shaft 17 adjacent the arm 16. A second cylinder 24 is pivotally mounted on the pivot 22 and the associated piston rod 25 therein is pivotally connected to the arm 16 through a bracket 26. By means of a fluid-directing system as set forth in the aforementioned copending application, fluid may be admitted to the cylinders 20 and 24, the relative diameters thereof causing the piston rod 21 to be extended to the intermediate position shown in dotted outline, whereupon the piston rod 25 is extended to raise the arms to the elevated position shown in dotted outline in Fig. 1. In accordance with the aforesaid application, a skip 27 extends transversely between the free ends of the arms 16, being pivotally mounted with respect to the arms along an axis extending transversely of the skip above its center of gravity so that the skip normally remains upright. A chain 28 is fixed to a portion of the chassis and to an off-center portion of the upper edge of the skip 27 in such manner as to be loose until the arms approach their upper limit of movement, whereupon the chains are tightened and cause the skip to swing about its pivotal axis to dump the material therein into the hopper 11. As explained in the aforesaid application, the pistons 21 and 25 may be retracted beyond the positions illustrated in Fig. 1 so that when the arms are lowered the skip may be brought to rest upon a support at various elevations with respect to the shaft 17. Lowering of the arms is accomplished by reversal of the flow of fluid into and from the opposite ends of the cylinders 20 and 24.

In accordance with the present invention, it is desired to disassociate the skip from the skip arms when the skip has been brought to rest upon the members 30 projecting upwardly from the scale bed of a weighing mechanism 31 resting upon the ground in front of the machine. Various types of mechanisms may be so employed, but it is preferred to employ a mechanism of the type having a standard 32 at one end upon which is rotatably mounted an indicating dial 33 which may be rotated to various positions so as to have the dial face the operator of the machine regardless of where he may be positioned. When the weight of the skip is being borne by the scale the arms 16 may travel a short distance further so as to disassociate the arms from the skip. Preferably a leg 34 projects downwardly from each arm in position to engage the frame of the scale beyond the scale bed portion so as to eliminate the necessity of the operator accurately gauging the over-travel of the skip arms. When the skip arms have over-traveled to an extent greater than the maximum possible downward movement of the members 30 when the skip is loaded, material may be dumped therein and the weight thereof immediately determined by watching the dial of the scale, which may register the gross load or the net load, as desired.

The skip is mounted on the arms through the medium of a pivot rod 40 extending transversely through the end walls 41 of the skip, the rod being journaled in bearing members 42 mounted in the end walls. Preferably a tube 43 surrounds the intermediate portion of the rod 40 to prevent damage thereto. The ends of the rod 40 project beyond the bearings 42 to provide pintles and are maintained in accurate position lengthwise by means such as setscrew collars 44, as illustrated in Fig. 5. The rod ends project through transverse, V-shaped notches 46 in the ends of the arms, the bottoms of which are rounded to the curvature of the rod, and the tops of which are extended by side plates 47 and 48 welded to the top of the arm 16 and braced by a rounded, depending flange 49 and a fillet 50 respectively. Preferably the upper ends of the extension plates 47 and 48 are connected by a top plate 51 welded to the upper edges thereof so that a triangular opening is provided. The side walls of the V-shaped notch which terminate in the rounded seating portion diverge upwardly from a vertical line through the center of the V-shaped notch when the arms 16 are projecting horizontally forwardly from the shaft 17. A lug 52 projects outwardly from the surface of the arm beneath the bottom of the notch 46 and is provided with a round opening 53 for reception of a downwardly tapering guide pin 54 welded to the end of the pivot rod 40. A butt plate 55 is welded to the top of the projecting end of the pivot rod 40 and extends above, and is welded to, the guide pin 54.

Figure 2:
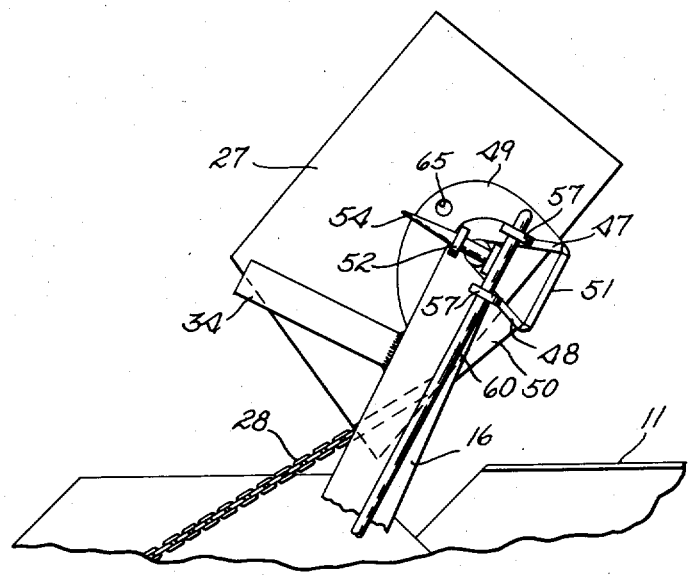
Fig. 2 is a partial view, in side elevation, showing the skip when being emptied of its contents.
Figure 3:
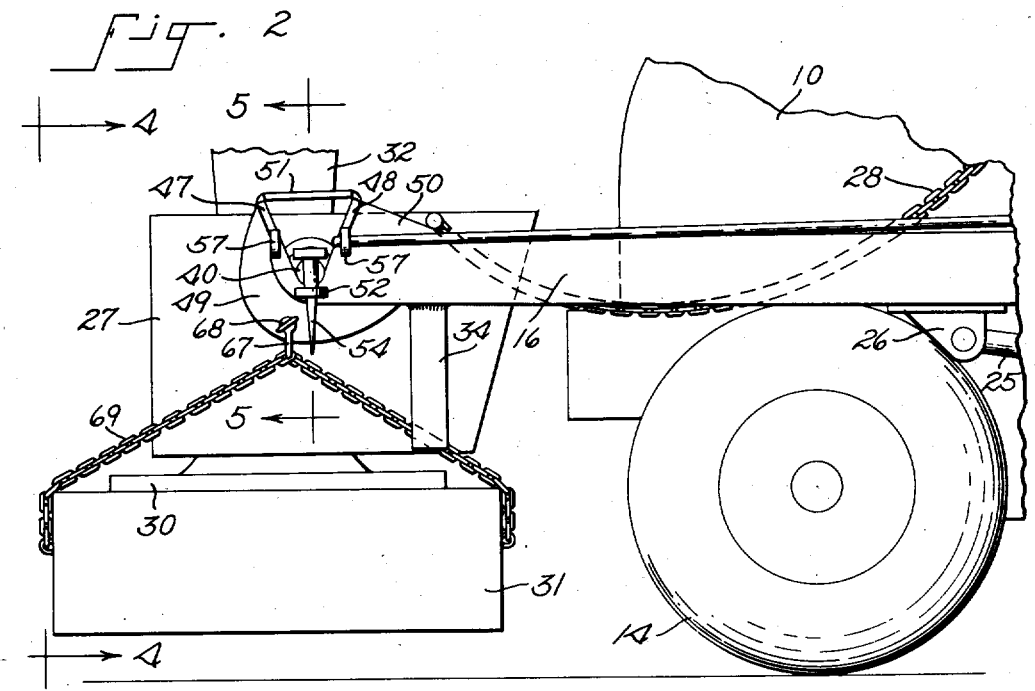
Fig. 3 is a partial side elevation showing the skip arms in lowered positions and illustrating the manner in which the weighing mechanism may be moved about from place to place.

When the arms have been raised from the position illustrated in Fig. 6 to the position illustrated in Fig. 5, the ends of the pivot rods are snugly received in the rounded portion of the notches 46, being centered therein by the guide pins 54 and the openings 53. When in such relation the upper edge of the butt plate 55 is substantially tangent to a line drawn between the bottoms of a pair of guide openings 56 in lugs 57 mounted on the arm 16 at the sides of the notch 46. When in such position a latch may be slid through the openings 56 to lock the pivot rod firmly onto the arms 16. This latch comprises the forward extremity of a latch rod 60, the forward extremity being slidably guided for longitudinal movement from a latching position engaged in both of the lugs 57 to a releasing position with its end withdrawn to one side of the notch 46. The rod 60 extends rearwardly along the upper edge of the arms 16 and its rear end is pivotally connected to a short post 61 which is mounted on the upper end of the brace 18 above the shaft 17. By reason of this association of the latch rods with the arms the ends of the latch rods are withdrawn from latching position as the arms approach the horizontal and the ends of the latch rods are projected through the openings in the lugs 57 to latching position as the arms are raised from the horizontal position, this latching position being held as the arms swing upwardly and arrive at their elevated position. The pivot rod 40 is thus latched to the ends of the skip arms when the skip is being dumped, as seen in Fig. 2, and released as the skip approaches the weighing mechanism, as seen in Figs. 1 and 3.

Preferably each of the flanges 49 is provided with an opening 66 by means of which clevises 67 may be retained by pins 68, the clevises being engageable with chains 69 welded or otherwise attached to the frame of the weighing mechanism. The weighing mechanism may therefore be lifted from the ground and conveyed from place to place.

Having illustrated and described a preferred embodiment of the present invention, it should be apparent to those skilled in the art that the invention permits of modification in detail and arrangement. We claim as our invention all such modifications as come within the true spirit and scope of the appended claims.

We claim:

1. Elevating mechanism for loose bulk materials comprising a spaced pair of skip arms mounted for pivotal movement about a horizontal axis, said arms being capable of movement from lowered, substantially horizontal positions to elevated, upright positions, means for coextensively and simultaneously swinging said arms about said horizontal axis, each of said arms having a notch at its free end, said notches opening upwardly when said arms are in their lowered positions, a pivot rod extending between said arms and having its ends extending into said notches, a skip pivotally mounted on said pivot rod between said arms above its center of gravity whereby said skip normally remains in upright position, latching means associated with each of said arms for latching the ends of said pivot rod in said notches as said arms move toward their elevated positions, means operatively associated with said skip for pivotally tilting said skip about said pivot rod as said arms approach their elevated positions whereby bulk materials in said skip may be dumped therefrom, and means for withdrawing said latching means from latching engagement with the ends of said pivot rod as said arms approach their lowered positions whereby said skip may be disassociated from said arms in order that the weight of materials deposited in said skip may be determined.

2. Elevating mechanism for loose bulk materials comprising a spaced pair of skip arms mounted for swinging movement about a horizontal axis, said arms being capable of movement in unison from lowered, substantially horizontal positions to elevated, upright positions, means for swinging said arms about said horizontal axis, each of said arms having a V-shaped notch at its free end, said notches opening upwardly when said arms are in their lowered positions, a pivot rod extending between said arms and having its ends extending into said notches, a skip extending laterally between said arms and pivotally suspended from said pivot rod above its center of gravity whereby said skip normally remains upright, a latch bolt associated with each of said arms for latching the ends of said pivot rod in said notches as said arms leave their lowered positions, means operatively associated with said skip for pivotally tilting said skip about said pivot rod as said arms approach their elevated positions whereby bulk materials in said skip may be dumped therefrom, and means for withdrawing said latch bolts from latching engagement with the ends of said pivot rod as said arms approach their lowered positions whereby said skip may be disassociated from said arms in order that the weight of materials deposited in said skip may be determined.

3. In a mixing machine having an elevated loading hopper, a pair of arms mounted coaxially for swinging movement about a horizontal axis, one at each side of said hopper, means for simultaneously swinging said arms from lowered positions to upright positions with their free ends above said hopper, a skip mounted between the free ends of said arms, and means for unloading the contents of said skip into said hopper as said arms approach their upper limit of movement; the improvement in the mounting of said skip comprising a pintle extending from each side of said skip, a support on each of said arms above which one of said pintles extends, a latching rod associated with each of said arms, means guiding one end of each of said latching rods for longitudinal movement across the sides of the support in its associated arm from a latching position above the bottom of said support to a releasing position at one side of said support whereby said supports may be lowered from engagement with said pintles in order that the skip and its contents may be weighed, and means pivotally retaining the opposite ends of said latching rods above the pivotal axis of said arms whereby said latching rods are moved to releasing positions as said arms are being lowered and moved to latching positions said arms are being raised.

4. An automotive mixing machine comprising an elevated loading hopper, a pair of arms mounted coaxially for swinging movement about a horizontal axis below said hopper, said arms being located one at each side of said hopper, means for simultaneously swinging said arms from lowered, substantially horizontal positions to elevated, substantially vertical positions with their free ends above said hopper, a chassis supporting said hopper and arms, wheels supporting said chassis, said arms being at the sides of said chassis and, when lowered, extending beyond an end of said chassis, a skip pivotally supported between the free ends of said arms, the pivotal connection of said skip to said arms comprising pivot pins on said skip and notches on said arms into which said pins project, said notches being open upwardly when said arms are in lowered position whereby said arms may be lowered to a greater extent than said skip in order that said skip may be weighed disassociated from said arms, and means automatically latching said pivot pins in said notches when said arms are being elevated.

5. Means for mounting a skip at the free ends of a pair of elevating arms comrising a pair of pintles projecting horizontally from the ends of said skip, a pair of normally open supports at the ends of said arms into which said pintles project, a downwardly tapering guide pin projecting downwardly from each pintle, a projection on each arm below said supports having openings therethrough into which said guide pins project, means to limit separation of said supports from said pintles to an extent less than the length of said guide pins, and means to latch said pintles against said supports.

6. Means for mounting a skip at the free ends of a pair of elevating arms comprising a pair of pintles projecting horizontally from the ends of said skip, a pair of normally open supports at the ends of said arms into which said pintles project, a downwardly tapering guide pin projecting downwardly from each pintle, a projection on each arm below said supports having openings therethrough into which said guide pins project, means to limit separation of said supports from said pintles to an extent less than the length of said guide pins, means to latch said pintles against said supports, and means for automatically operating said latching means in response to movement of said arms.

HAROLD A. WAGNER.
GUSTAVE H. WAGNER.

REFERENCES CITED

The following references are of record in the file of this patent:

UNITED STATES PATENTS

| Number | Name | Date |
|---|---|---|
| 941,571 | Fullbright | Nov. 30, 1909 |
| 1,052,096 | Schulze | Feb. 4, 1913 |
| 1,855,420 | Robb, Sr. | Apr. 26, 1932 |
| 2,019,451 | Harm | Oct. 29, 1935 |
| 2,313,514 | Brooks | Mar. 9, 1943 |
| 2,441,591 | Owen | May 18, 1948 |

Certificate of Correction

Patent No. 2,565,792                                August 28, 1951

HAROLD A. WAGNER ET AL.

It is hereby certified that error appears in the printed specification of the above numbered patent requiring correction as follows:

Column 5, line 59, after "positions" insert *as*; column 6, line 22, for "comrising" read *comprising*;

and that the said Letters Patent should be read as corrected above, so that the same may conform to the record of the case in the Patent Office.

Signed and sealed this 20th day of November, A. D. 1951.

[SEAL]

THOMAS F. MURPHY,
*Assistant Commissioner of Patents.*